(12) United States Patent
Grossmann et al.

(10) Patent No.: US 7,194,319 B2
(45) Date of Patent: Mar. 20, 2007

(54) METHOD AND ARRANGEMENT FOR CONTROLLING THE POSITION OF AN ACTUATING ELEMENT

(75) Inventors: Alex Grossmann, Gernsbach (DE); Torsten Baumann, Eppingen-Adelshofen (DE)

(73) Assignee: Robert Bosch GmbH, Stuttgart (DE)

( * ) Notice: Subject to any disclaimer, the term of this patent is extended or adjusted under 35 U.S.C. 154(b) by 113 days.

(21) Appl. No.: 10/456,621

(22) Filed: Jun. 9, 2003

(65) Prior Publication Data
US 2004/0002777 A1 Jan. 1, 2004

(30) Foreign Application Priority Data
Jun. 28, 2002 (DE) .................................. 102 29 238

(51) Int. Cl.
    *G05B 13/02* (2006.01)
    *F02D 31/00* (2006.01)
    *G06F 7/00* (2006.01)

(52) U.S. Cl. .................... 700/33; 123/339.24; 123/333; 701/37

(58) Field of Classification Search .................. 700/33; 123/339.24, 333, 399, 361, 339, 491; 172/2; 701/37
See application file for complete search history.

(56) References Cited

U.S. PATENT DOCUMENTS

| | | | | |
|---|---|---|---|---|
| 3,800,755 A | * | 4/1974 | Klaiber et al. .............. 123/361 |
| 4,337,511 A | * | 6/1982 | Schneider et al. ............ 701/93 |
| 4,622,936 A | * | 11/1986 | Junginger et al. .......... 123/399 |
| 5,048,482 A | * | 9/1991 | Kratt et al. ................. 123/333 |
| 5,213,078 A | * | 5/1993 | Kolberg et al. ............. 123/399 |
| 5,265,570 A | * | 11/1993 | Schnaibel et al. ..... 123/339.24 |
| 5,810,095 A | * | 9/1998 | Orbach et al. ................. 172/2 |
| 5,908,456 A | * | 6/1999 | Wahlers ....................... 701/37 |
| 6,062,198 A | * | 5/2000 | Loehr .......................... 123/399 |
| 2003/0005819 A1 | * | 1/2003 | Schluter et al. ........... 91/376 R |

OTHER PUBLICATIONS

Kuhnke Electronics Instruction Manual Drive Control 682DP Remote Positioning System, May 29, 2000 pp. 1-8 and 41-60.*

* cited by examiner

*Primary Examiner*—Anthony Knight
*Assistant Examiner*—Sunray Chang
(74) *Attorney, Agent, or Firm*—Walter Ottesen

(57) ABSTRACT

The invention is directed to a method and an arrangement for controlling the position of an actuating element (1) which prevent damage to the actuating element by a collision with at least one stop (25, 30) and simultaneously ensure good dynamic characteristics. The position of the actuating element (1) tracks a desired value within a displacement range. The displacement range is limited for the actuating element (1) by at least one stop (25, 30). A check is made as to whether the distance between the desired value for the position of the actuating element (1) and the at least one stop (25, 30) drops below a pregiven value (S1). Only in this case is a change of the desired value limited.

8 Claims, 3 Drawing Sheets

METHOD AND ARRANGEMENT FOR CONTROLLING THE POSITION OF AN ACTUATING ELEMENT

BACKGROUND OF THE INVENTION

Methods are already known for controlling the position of an actuating element configured as a throttle flap, an exhaust-gas recirculation valve or as a charge movement flap. The position of the actuating element within a displacement range tracks a desired value and the displacement range is limited by at least one stop for the actuating element.

For the position of the actuating element, a digital control is utilized in a motor vehicle which is carried out by the engine control apparatus. For example, the two methods discussed below are used.

In a first method, a sufficiently high scanning rate must be ensured for the control of the position of the actuating element. Here, it must be prevented that the mechanical stops are not driven against in order to avoid damage to the actuating elements. For this purpose, the displacement range is limited with the aid of an offset. For the described systems having high scanning rates, the offset can, as a rule, be selected small because the design of the control can be so selected that only overshoots with low amplitudes occur.

In a second method, the digital control of the position of the actuating element is carried out at a scanning rate, which is less in comparison to the first method, in order to save on running time and the actuating element need not be moved with high dynamic. In this method, a desired value change limit is mostly used. In this way, overshoots are substantially suppressed.

SUMMARY OF THE INVENTION

Compared to the above, the method and arrangement of the invention for controlling the position of an actuating element afford the advantage that a check is made as to whether the distance between the desired value for the position of the actuating element and the at least one stop is less than a first pregiven value and, only in this case, is a change of the desired value limited. In this way, the desired value change limiting can be limited to the endangered range(s) wherein virtually no overshoots may occur or in which a specific displacement speed may not be exceeded when positioning the actuating element in order to prevent a movement against the at least one stop by the actuating elements and thereby prevent possible damage to the actuating element. It is true that overshoots can occur in the control of the actuating element but these overshoots do not take place in the above-mentioned endangered ranges and therefore do not lead to damage of the actuating element. By saving the desired value change limiting in non-endangered ranges in the above-described second method, a more rapid change of the desired value for the positioning of the actuating element is realized with a high dynamic and therefore the control of the position of the actuating element is accelerated.

Furthermore, with the desired value change limiting in the endangered regions, compared to the first-mentioned method, no offset between the at least one stop and the start of the displacement range is required or the offset can be minimized. This is especially advantageous for systems wherein a throughflow quantity is to be controlled by the position of an actuating element and wherein, for achieving a minimum throughflow quantity, the actuating element must be driven as close as possible to the at least one mechanical stop. This is, for example, an advantage for reducing the leakage air by means of an actuating element configured as a throttle flap in a vehicle. With the method of the invention and the arrangement of the invention, it is ensured that the actuating element is driven sufficiently slowly and so protects the component when driven in the direction toward the at least one mechanical stop.

It is especially advantageous that a limiting of the change of the desired value is lifted when the distance between the desired value for the position of the actuating element and the at least one stop becomes greater. In this way, the desired value change limiting can be disabled also in the above-mentioned endangered regions when the desired value for the positioning of the actuating element moves in the direction out of the particular endangered region because, in this case, one does not have to consider a collision of the actuating element with the at least one stop. In this way, a dynamic improvement for the change of the desired value and therefore an acceleration of the control of the positioning of the actuating element is realized also in the endangered region(s).

A further advantage is that the desired value is maintained when the distance between the desired value and the at least one stop reaches the first pregiven value as long as the distance between an actual value for the position of the actuating element and the at least one stop does not exceed the first pregiven value and the change-limited desired value is inputted after reaching or dropping below the first pregiven value by the distance of the actual value from the at least one stop. In this way, the advantage is realized that overshoots of the actual value for the position of the actuating element, because of the inertia of the actuating element, are reliably suppressed by the change limiting of the desired value for the position of the actuating element.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
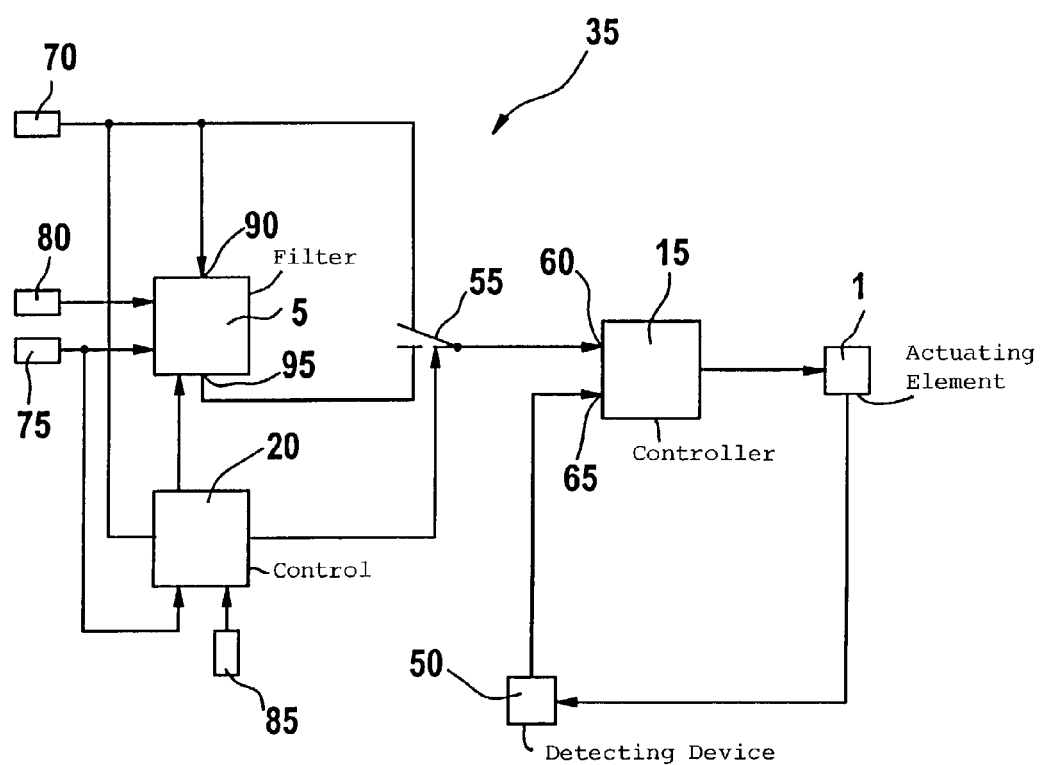
FIG. 1 shows a block circuit diagram of the arrangement of the invention.

In FIG. 1, reference numeral 35 identifies an arrangement for controlling the position of an actuating element 1. Means 15 are provided for bringing the position of the actuating element closer to a desired value within a displacement range. The means 15 can, for example, be configured as a controller which causes an actual value for the position of the actuating element 1 to track the desired value within the displacement range of the actuating element 1. At least one stop for the actuating element 1 is provided which limits the displacement range of the actuating element. The actuating element 1 can be maximally driven up to the at least one stop. A displacement of the actuating element beyond the at least one stop is not possible. The at least one stop can, for example, be a mechanical stop.

Figure 4:
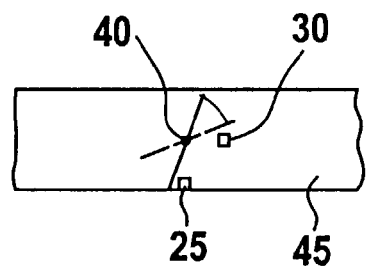
FIG. 4 shows an actuating element with two mechanical stops.

In FIG. 4, an example of such an actuating element 1 is shown. The actuating element 1 can, for example, be a throttle flap, a charge movement flap, an exhaust-gas recirculation valve or the like in a vehicle. According to FIG. 4, a first stop 25 and a second stop 30 are shown by way of example. According to the example of FIG. 4, the actuating element 1 is rotatably journalled about a center axis 40.

In the following, it should be assumed by way of example that the actuating element 1 is a throttle flap in an intake manifold 45 of an internal combustion engine. The first stop 25 defines a lower stop and the second stop 30 defines an upper stop in the intake manifold 45. The lower stop 25 is always driven to. The second, upper stop 30 is, as a rule, also always present but is mostly not driven to or the distance is very great.

In the block circuit diagram of FIG. 1, the arrangement 35 further includes a detecting device 50 for detecting the actual value of the position of the actuating element 1. The actual value, which is detected by the detecting device 50, is supplied to the controller 15 as an input quantity. As additional input quantity, the desired value for the position of the actuating element 1 is supplied to the controller 15. The position of the actuating element 1 is electronically adjusted in the displacement range of the actuating element 1 by an output signal of the controller 15. The output signal of the controller 15 is formed in dependence upon the difference between the desired value and the actual value in such a manner that the position of the actuating element 1 tracks the desired value, for example, in the sense of a minimum control deviation. The desired value is supplied to the controller 15 via a switch 55. The switch 55 is controlled by a control 20. The desired value is supplied to the controller 15 via a desired value input 60 and the actual value is supplied via an actual-value input 65. Via the switch 55, the desired value input 60 can be connected either to an output of a filter 5 (for example, a lowpass) or to a desired value store 70. The desired value store 70 can be connected to an engine control (not shown in FIG. 1). The engine control inputs the desired value for the position of the actuating element 1 and stores the same in the desired value store 70. The desired value can be pregiven by the engine control, for example, in dependence upon a driver command torque.

In the following, it should, for example, be assumed that the filter 5 is a lowpass filter. A time constant is supplied to the lowpass 5 from a time-constant memory 80. Furthermore, a limit value is supplied to the lowpass 5 from a limit value store 75 and the lowpass 5 can be initialized with the limit value. The initialization of the lowpass 5 takes place via a control signal from the control 20. The limit value from the limit value store 75 is also supplied to the control 20. The desired value from the desired value store 70 is supplied to the lowpass 5 as an input signal to be filtered as well as to the control 20. Furthermore, a first pregiven value S1 is supplied from the input value store 85 to the control 20.

Figure 2:
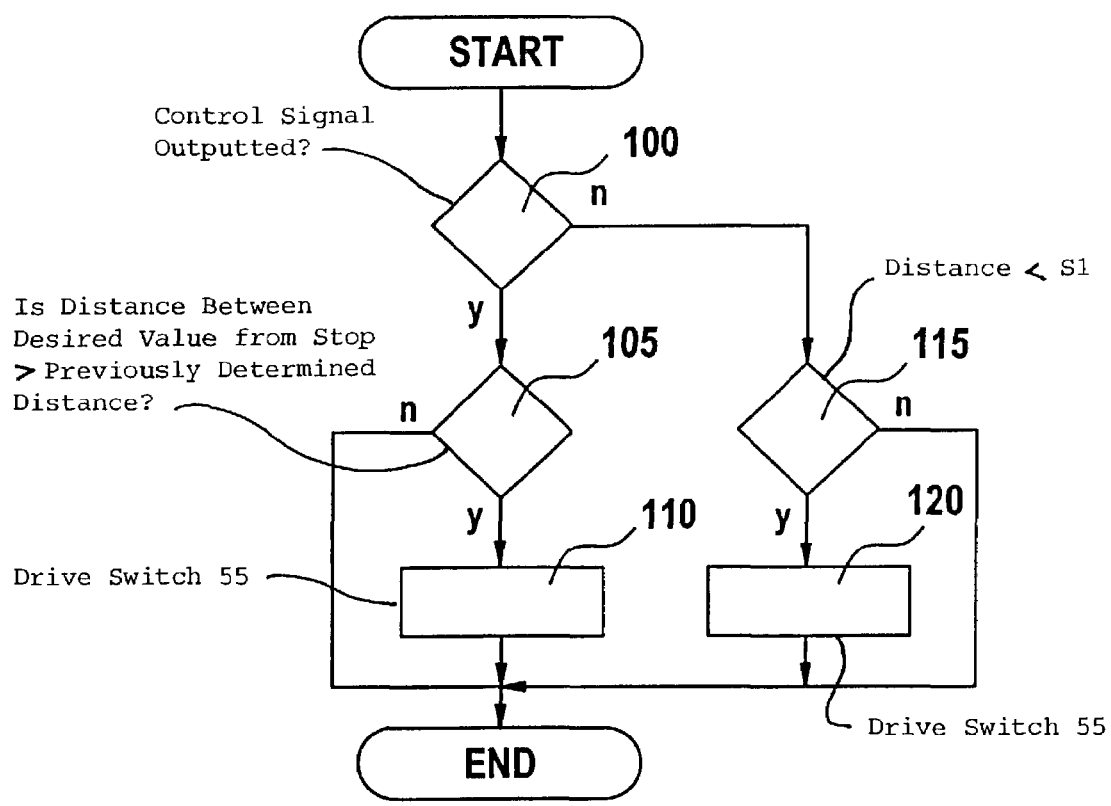
FIG. 2 is a flowchart showing the method of the invention.

The operation of the arrangement of FIG. 1 is explained in the following with reference to the flowchart in FIG. 2 and is by way of example.

After the start of the program and at program point 100, the control 20 checks whether a control signal is outputted to the switch 55 for connecting the output of the lowpass 5 to the desired value input 60 of the controller 15. If this is the case, then it is assumed in the control 20 that the output of the lowpass 5 is connected to the desired value input 60 via the switch 55 and therefore a desired value change limiting is active. In this case, there is a branching to program point 105; otherwise, there is a branching to program point 115. For an active desired value change limiting, the change of the desired value is limited by the filter action of the lowpass 5 and an overshoot of the actuating element is substantially avoided during the control.

At program point 115, the desired value change limiting is not active and the switch 55 is driven by the control 20 in such a manner that the switch directly connects the desired value store 70 to the desired value input 60. At program point 115, the control 20 determines a first distance between the desired value for the position of the actuating element 1 and the first stop 25 and a second distance between the desired value for the position of the actuating element 1 and the second stop 30. Based on the point symmetry to the center axis 40 of the arrangement shown in FIG. 4, it should be assumed by way of example in the following that the first distance and the second distance are essentially the same so that, in the following, the description is with respect to only a single distance.

At program point 115, the control 20 checks whether the distance is less in magnitude than the first pregiven value S1. If this is the case, then there is a branching to program point 120; otherwise, there is a movement out of the program. At program point 120, the control 20 causes a drive of the switch 55 in such a manner that the switch connects the output of the lowpass 5 to the desired value input 60. Furthermore, the control 20 triggers the initialization of the lowpass 5 with the limit value from the limit value store 75. Here, the limit value defines a position of the actuating element 1 which is spaced from the corresponding stop (25, 30) by the first pregiven value S1. For a switchover of the switch 55 for connecting the output of the lowpass 5 to the desired value input 60, the limit value from the limit value store 75 is supplied as a desired value to the desired value input 60 with an approximately simultaneous initialization of the lowpass 5. Thereafter, the output 95 of the lowpass 5 is made to approach the desired value from the desired value store 70, which is applied to the filter input 90 of the lowpass 5, via lowpass filtering with the time constant from the time constant store 80 and is supplied via the switch 55 to the desired value input 60 of the controller 15. Thereafter, there is a movement out of the program.

In this way, the desired value change limiting is limited by means of the lowpass 5 to the regions whereat the distance between the desired value from the desired value store 70 and the particular stop (25, 30) is less than the first pregiven value S1. For a suitable selection of the first pregiven value S1, the desired value change limiting can thereby be limited to a region close to the stop so that, in this region, overshoots in the control of the position of the actuating element 1 can be substantially avoided. In this way, a driving to the stops (25, 30) by the actuating element 1 and therefore damage to the actuating element 1 is prevented. In contrast, outside of the region close to the stop and fixed by the first pregiven value S1, the desired value can be pregiven without a desired value change limiting and therefore without dynamic loss and the control of the position of the actuating element 1 accelerated. With the desired value change limiting, which is carried out in the above region close to the stop, an offset in this region between the particular stop (25, 30) and the beginning of the displacement range is unnecessary or such offset can be reduced to a minimum because, as described, the occurrence of overshoots in this region is substantially avoided in the tracking of the actuating element 1.

At program point 105, the control 20 checks whether the distance between the desired value from the desired value store 70 and the particular stop (25, 30) becomes greater than the previously determined distance. If this is the case, then there is a branching to program point 110; otherwise, there is a movement out of the program.

At program point 110, the control 20 causes a switchover of the switch 55 in such a manner that the desired value store 70 is directly connected to the desired value input 60 of the controller 15 and the desired value change limiting by the lowpass 5 is thereby disabled or deactivated. In this way, the desired value change limiting, which is carried out in the described region close to the stop, can again be disabled when the desired value for the position of the actuating element 1 moves away from the particular stop (25, 30) and therefore a collision of the actuating element with the stops (25, 30) is not a danger. The desired value change limiting is disabled even when the desired value, which moves away from the particular stop (25, 30), is still disposed in the region, which is close to the stop and defined by the first pregiven value S1; that is, the distance of the desired value from the particular stop (25, 30) is less in magnitude than the pregiven value S1. In this way, a dynamic improvement for the desired value can be achieved also in the region close to the stop and therefore an acceleration of the control of the position of the actuating element 1 can be achieved when a drive of the actuating element 1 to the stops (25, 30) can be precluded.

After the end of the program, the program can be run through as often as desired.

According to FIG. 1, the desired value change limiting is realized based on the lowpass 5. The invention is, however, not limited to a lowpass for realizing the desired value change limiting function. Rather, any desired desired value change limiting functions can be used.

Figure 3:
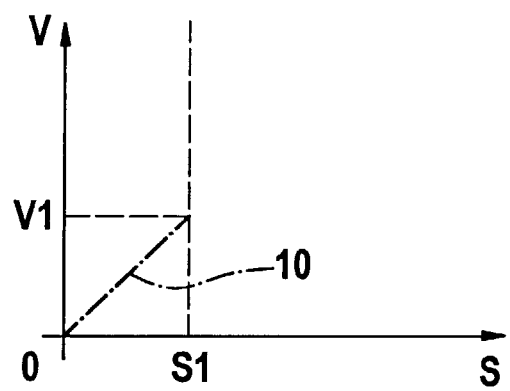
FIG. 3 shows the course of the limiting of the displacement speed for the change of the desired value for the position of an actuating element as a function of the distance between the desired value for the position of the actuating element and at least one stop for the actuating element.

FIG. 3 shows a further example for the above. In FIG. 3, a course 10 of a pregiven displacement speed (v) is shown over the distance (s) between the desired value and the particular stop (25, 30). In the example of FIG. 3, the course 10 climbs from the distance s=0 up to the first pregiven value s=S1 linearly from the displacement speed v=0 up to a first pregiven displacement speed v=V1. This means that the displacement speed (v) for which the desired value goes linearly to zero with decreasing distance to the particular stop (25, 30) so that the desired value with decreasing distance to the particular stop (25, 30) should be changed less so that overshoots in the tracking of the actuating element 1 are ever more strongly suppressed. A nonlinear course may be selected in lieu of the linear course 10 for the pregiven displacement speed shown in FIG. 3. This nonlinear course starting with the distance s=0 at the displacement speed v=0 and increasing for increasing distances (s) can be at least greater than zero. The linear trace 10 for the pregiven displacement speed shown in FIG. 3 can, for example, be a ramp function. The displacement speed (v) is exemplary in FIG. 3 for a change of the desired value in the direction of the particular stop (25, 30) because, as described, a desired value change limiting can be omitted in the reverse direction. The displacement speed (v) according to FIG. 3 is pregiven maximally also only up to the distance s=S1 because, for greater distances, the desired value change limiting should be deactivated in accordance with the invention. The limiting of the change of the desired value by the pregiven displacement speed can be carried out starting from the embodiment of FIG. 1 in lieu of the lowpass function described there. In this case, a supply of the time constants and the limit value is not required. Overshoots need therefore not be absolutely avoided because one has sufficient distance to the particular stop (25, 30). Because of the ramp, the control is then so slowed that no overshoots occur. The drive of the switch 55 by the control 20 takes place, for example, in the manner described according to the flowchart of FIG. 2. An additional initialization of the desired value limiting function with pregiven displacement speed by the control 20 in the region close to a stop is not required because the limiting action is initiated with the switchover of switch 55 for connecting the output of the desired value change limiting function to the desired value input 60. The block in FIG. 1, which is identified by reference numeral 5, can therefore, in general, define any desired desired value change limiting function including the input 90 and the output 95. In accordance with the example described here, the block 5 can be configured as a lowpass or as a desired value change limiting function having pregiven displacement speed.

The invention was described with respect to the example of an actuating element and two stops (25, 30). The invention is also applicable in a corresponding manner for an actuating element and only one stop or more than two stops. Accordingly, only one region close to the stop or more than two regions close to stops have to be considered in a corresponding manner.

Figure 5A:
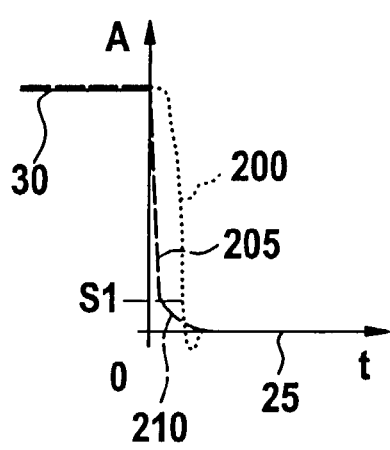
FIG. 5a shows an exemplary course for the desired value for the position of the actuating element and an actual value for the position of the actuating element resulting therefrom with an overshoot; and, FIG. 5b shows a further exemplary course for the desired value for the position of the actuating element and the resulting course of the actual value for the position of the actuating element without overshoots.

In FIG. 5a, the course of the distance A of the desired value for the position of the actuating element 1 from the first stop 25 is shown by a broken line in the diagram and is identified by reference numeral 205. The distance A between the position of the actuating element 1 and the first stop 25 is plotted as a function of time (t). Here, the ordinate is the distance and the abscissa is the time. At time point t=0, the desired value is at the second stop 30. From time point t=0, the distance A of the desired value decreases to the first stop 25 up to the first pregiven value S1. After reaching the first pregiven value S1, the distance then decreases between the desired value and the first stop 25 in its change limited by an ever lesser slope and approaches zero.

Figure 5B:
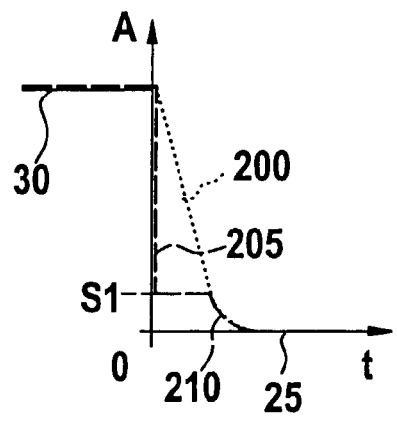

In FIG. 5a, the distance between the actual value for the position of the actuating element 1 and the first stop 25 is furthermore shown by a dotted line and is identified by reference numeral 200. Due to the control of the position of the actuating element 1, the course of the distance between the actual value and the first stop 25 follows the course of the distance between the desired value and the first stop 25 with a certain time delay. Because of the inertia of the actuating element 1, the change limiting of the desired value is likewise carried out by the actual value with a time delay so that, at first, an overshoot of the distance between the actual value and the first stop 25 occurs when the change of the desired value is limited as shown in FIG. 5a. Such an overshoot is to be absolutely avoided in order to prevent damage to the actuating element 1 and to the first stop 25. For this reason, in FIG. 5, the desired value for the position of the actuating element 1 is maintained as soon as the distance between the desired value and the first stop 25 reaches the first pregiven value S1 starting from higher values. In FIG. 5b, the same reference numerals are used for the same elements as in FIG. 5a. A further approaching of the desired value for the position of the actuating element 1 to the first stop 25 takes place only at the time point at which the distance between the actual value and the first stop 25 likewise reaches the first pregiven value S1 starting from higher values. From this time point on, the desired value is brought to the first stop 25 change limited (that is, with an ever decreasing slope) so that the actual value can follow the desired value without significant time delay in the above-mentioned control and overshoots of the actual value for the position of the actuating element 1 are avoided.

It is understood that the foregoing description is that of the preferred embodiments of the invention and that various changes and modifications may be made thereto without departing from the spirit and scope of the invention as defined in the appended claims.

What is claimed is:

1. A method for controlling the position of an actuating element, the method comprising the steps of:
   causing said actuating element to track a desired value for the position of said actuating element within a displacement range with said displacement range being mechanically limited by at least one mechanical stop for said actuating element;
   checking whether the distance between said desired value for the position of said actuating element and said one mechanical stop drops below a first pregiven value (S1); and,
   if so, and only in this case, limiting a change of said desired value.

2. The method of claim 1, wherein said change of said desired value is limited by filtering.

3. The method of claim 2, wherein said filtering is done using a lowpass filter.

4. The method of claim 1, wherein the change of said desired value is limited to a pregiven displacement speed.

5. The method of claim 4, wherein the change of said desired value is limited by a ramp function.

6. The method of claim 1, wherein the limiting of the change of said desired, value is disabled when the distance between said desired value and said one mechanical stop becomes greater.

7. The method of claim 1, wherein said desired value is maintained when the distance between said desired value and said one mechanical stop reaches said first pregiven value (S1) as long as the distance between an actual value for the position of said actuating element and said at least one mechanical stop exceeds said first pregiven value (S1) and, after the distance of said actual value from said one mechanical stop reaches or drops below said first pregiven value (S1), the change-limited desired value is pregiven.

8. An arrangement for controlling the position of an actuating element, the arrangement comprising:
   means for bringing the position of said actuating element closer to a desired value for the position of said actuating element within a displacement range;
   at least one mechanical stop for said actuating element for limiting said displacement range;
   means for limiting a change of said desired value;
   means for checking whether the distance between said desired value for the position of said actuating element and said one mechanical stop drops below a first pregiven value (S1); and,
   means for activating said limiting means only when said distance drops below said first pregiven value (S1).

* * * * *